(12) United States Patent
Gresham et al.

(10) Patent No.: US 7,264,294 B2
(45) Date of Patent: Sep. 4, 2007

(54) INTEGRATED CENTER STACK FOR A MOTOR VEHICLE

(75) Inventors: Timothy Gresham, Woodhaven, MI (US); Michael W Cass, Lenox, MI (US); Gail C Miciuda, Grosse Pointe Park, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 43 days.

(21) Appl. No.: 10/906,550

(22) Filed: Feb. 24, 2005

(65) Prior Publication Data

US 2006/0186689 A1 Aug. 24, 2006

(51) Int. Cl.
*B60K 37/00* (2006.01)

(52) U.S. Cl. .......................... 296/70; 180/90
(58) Field of Classification Search ................. 296/70; 180/90
See application file for complete search history.

(56) References Cited

U.S. PATENT DOCUMENTS

| | | | |
|---|---|---|---|
| 5,709,358 A | 1/1998 | Kubota | |
| 5,788,532 A | 8/1998 | Takiguchi et al. | |
| 5,873,749 A | 2/1999 | Takiguchi et al. | |
| 6,388,881 B2* | 5/2002 | Yamauchi et al. | 361/704 |
| 6,505,876 B1* | 1/2003 | Watanabe | 296/70 |
| 6,709,041 B1 | 3/2004 | Hotary et al. | 296/70 |
| 6,953,541 B2* | 10/2005 | Kim | 264/141 |
| 7,005,092 B2* | 2/2006 | Dooley et al. | 264/46.5 |
| 7,021,691 B1* | 4/2006 | Schmidt et al. | 296/70 |
| 2003/0165664 A1* | 9/2003 | Carroll et al. | 428/138 |
| 2004/0164531 A1* | 8/2004 | Riha et al. | 280/732 |
| 2006/0264555 A1* | 11/2006 | Lustiger et al. | 524/451 |

FOREIGN PATENT DOCUMENTS

| | | |
|---|---|---|
| DE | 198 07 309 A1 | 8/1999 |
| JP | 8-2290 | 6/1994 |

OTHER PUBLICATIONS

European Patent Office, Combined Search and Examination Report in corresponding European Application No. GB0603270.0 dated May 16, 2006.

* cited by examiner

*Primary Examiner*—Dennis H. Pedder
(74) *Attorney, Agent, or Firm*—Wood, Herron & Evans, LLP

(57) ABSTRACT

A center stack for an instrument panel of a motor vehicle. The center stack includes a front plate having an exposed surface with a first surface finish and a back plate having a visible portion uncovered by the front plate. The front plate has at least one opening extending through the exposed surface for accessing at least one operational feature of the motor vehicle. The visible portion of the back plate has a second surface finish that differs from the first surface finish of the front plate. The back plate may include a flex joint that permits the visible portion of the back plate to move relative to an adjacent non-visible portion covered by the front plate.

19 Claims, 4 Drawing Sheets

INTEGRATED CENTER STACK FOR A MOTOR VEHICLE

FIELD OF THE INVENTION

The present invention relates generally to motor vehicle interior components and, more particularly, to center stacks for use in the passenger cabin of a motor vehicle.

BACKGROUND OF THE INVENTION

Instrument panels or dashboards for motor vehicles, such as automobiles, generally include modules integrated together and installed as a single unit into a forward portion of a vehicle passenger cabin. The "center stack" region of the instrument panel supports various controls and interior features. Conventional center stacks may include sound system controls, climate controls for the heating, ventilation, and air conditioning (HVAC) system, and vents or outlets that exhaust air supplied from the vehicle's HVAC system, among other controls and features. Components, such as the sound system, are mounted in the center stack proximate to the controls. The center stack is closed out with a front plate or trim bezel having a front side with Class A surfaces suitable for a vehicle interior that are visible to occupants of the passenger cabin.

Because stacking space is limited, integrated center stacks represent an evolution in center stack technology in which the actual components, like the sound system and the HVAC electronics, are not supported by the center stack. Instead, the components are mounted remote from the center stack at other locations inside the vehicle. The controls for the components remain associated with the center stack and are accessible to the occupants seated in the front of the passenger cabin. The controls are connected with the actual components by a flex cable, flat wire, or transmitted radio frequency signals to increase the stacking space. The individual controls may include circuit boards mounted to the center stack. Integrated center stacks, which are also conventional, are more compact than earlier generation conventional center stacks that provided support for the components themselves. Integrated center stacks are also closed out with a front plate or trim bezel having a Class A surface visible to occupants of the passenger cabin.

Front plates are typically single-piece constructions that may include outlets for the HVAC system defined in the front plate. Different or contrasting finishes may be applied to different visible surfaces or regions of the front plate. For example, one region on the front plate may be painted and an adjacent region on the front plate may have a wood grain finish from, for example, a laminate. If different or contrasting finishes are applied on different regions of the front plate, a transition zone or paint ditch is required along the boundary across which the finish changes. Alternatively, separate bezels may be positioned to cover the regions with contrasting finish to achieve a suitable finish transition.

It would be desirable to provide an improved center stack that permits the visible surface finish on the center stack to differ or contrast between different regions without the use of a paint ditch or another expensive feature.

SUMMARY OF THE INVENTION

In an embodiment of the present invention, a center stack for an instrument panel of a motor vehicle includes a front plate having an exposed surface with a first surface finish and a back plate having a visible portion uncovered by the front plate. The front plate has at least one opening extending through the exposed surface for accessing an operational feature of the motor vehicle. The visible portion of the back panel has a second surface finish differing from the first surface finish of the front plate.

In another embodiment of the present invention, a center stack for an instrument panel of a motor vehicle includes a front plate having an exposed surface and a back plate having a central panel covered by the front plate. The front plate includes at least one opening extending through the exposed surface for accessing an operational feature of the motor vehicle. The back plate further includes a visible portion uncovered by the front plate when the front plate is assembled with the back plate and a flex joint joining the visible portion with the central panel. The flex joint permits the visible portion to move relative to the central panel.

The invention therefore provides a center stack assembled from two components, a front plate and a back plate, with two different or contrasting surface finishes and no gap (e.g., no paint ditch) between the different or contrasting surface finishes. To that end, the structural back plate is integrated with outboard bezels, which allows these outboard bezels to have a different finish than the center stack trim plate. Combining the bezels with the back plate eliminates the need for additional separate bezels required to achieve a suitable finish transition.

These and other objects and advantages of the invention shall become more apparent from the accompanying drawings and description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Figure 1:
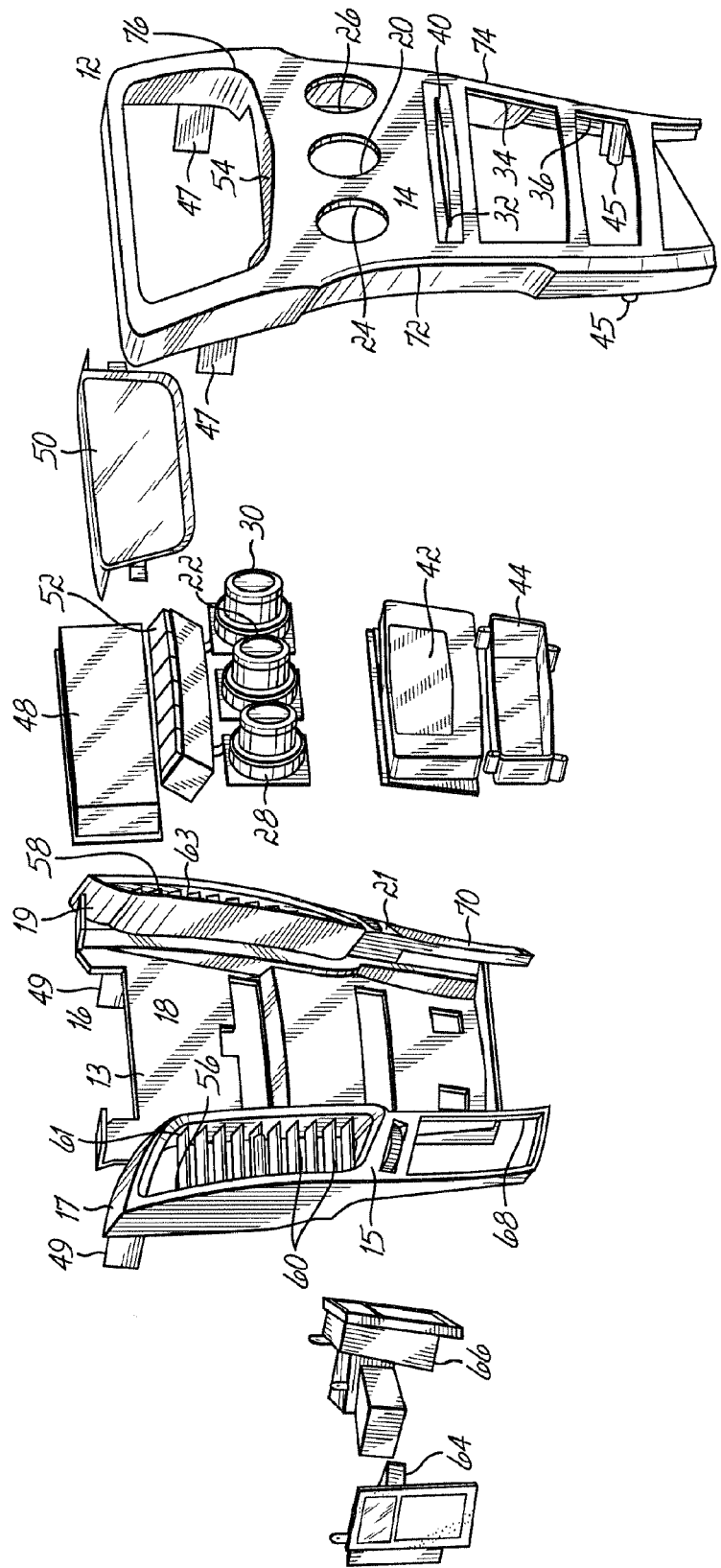
FIG. 1 is an exploded view of a composite center stack in accordance with the present invention.
Figure 2:
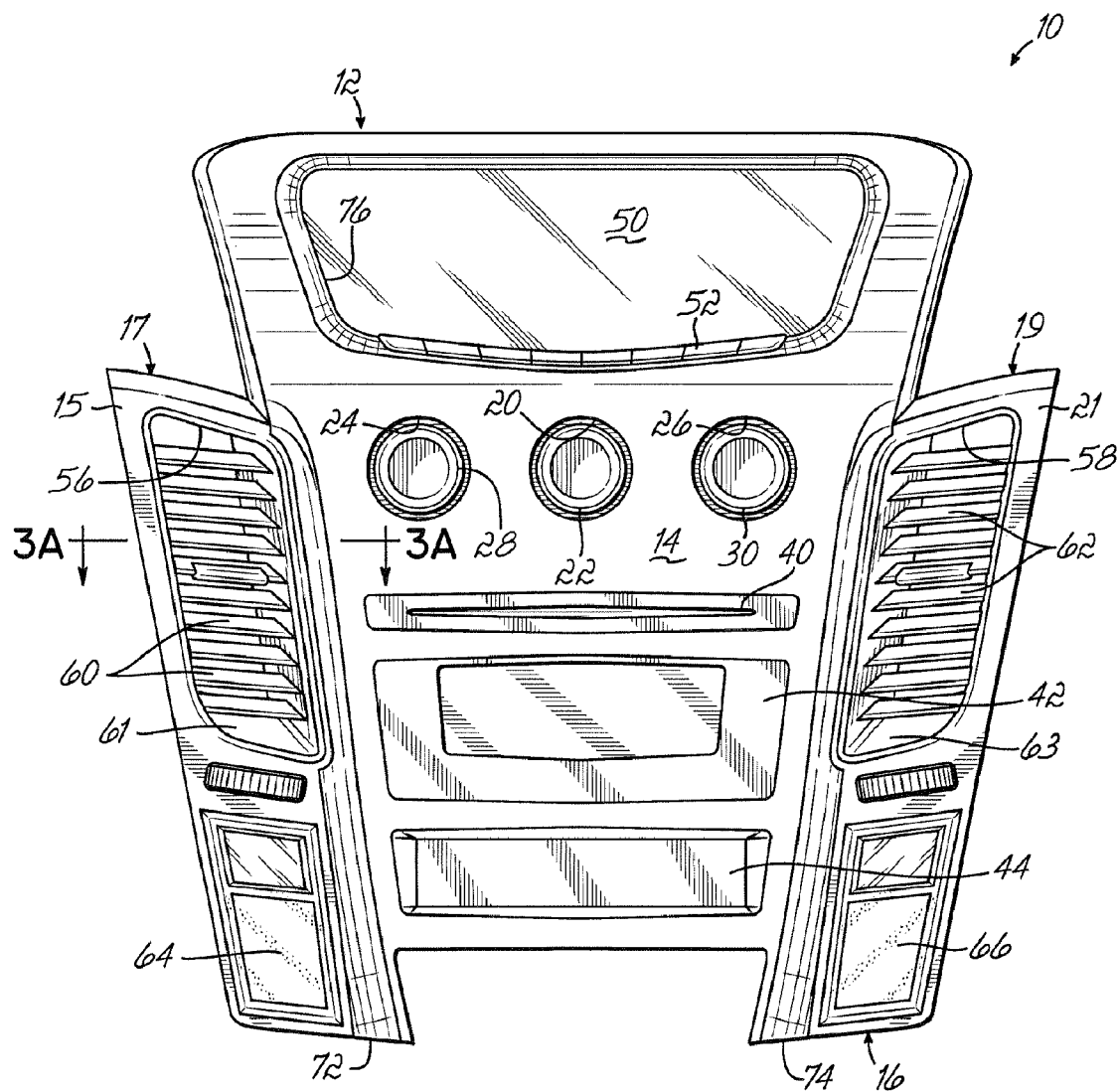
FIG. 2 is front view of the assembled center stack of FIG. 1.

With reference to FIGS. 1 and 2, a composite center stack 10 for a vehicle is an assembly that includes a front plate 12 and a structural back plate 16 having a central panel 13 with a hidden outer surface 18 that is covered by front plate 12 in an assembled condition. The front plate 12 has a visible outer surface 14 and a hidden inner surface 11 (FIG. 3A) that confronts the hidden outer surface 18 of central panel 13 after assembly. Flanking the hidden outer surface 18 of the back plate 16 is a laterally-spaced pair of lateral portions having the form of appendages or wings 17, 19. Each of the wings 17, 19 projects from the central panel 13 to define a channel that receives the front plate 12. Each of the wings 17, 19 also has a corresponding visible outer surface 15, 21 and is integrally connected with the central panel 13 to form a one-piece unitary structure so that hidden outer surface 18 is continuous with visible outer surfaces 15, 21.

Front plate 12 includes a plurality of laterally-spaced circular openings 20, 24, 26, each of which receives one of a corresponding plurality of controls, in the form of knobs 22, 28, 30, for controlling the operation of, for example, a stereo system (not shown). Vertically spaced from openings 20, 24, 26 are openings 32, 34, 36, and 38 arranged in a vertically stacked fashion. Opening 32 receives a module or panel 40 that may include, for example, a loading slot for compact disks. Opening 34, which is positioned below opening 32, receives, a module or panel 42 bearing, for example, additional controls for the stereo system. Opening 36, which is positioned below opening 34, receives, for example, an open storage bin 44. A display 48 covered by a separate lens 50 and an accompanying bank of controls 52 is positioned in a curved recess 54 defined along an upper peripheral edge of the front plate 12. Of course, the number of openings in front plate 12 and the specific type of structural elements filling each opening are matters of design choice as understood by a person of ordinary skill in the art.

The panels 28, 30, 40, 42, each of which may include a circuit board with interconnected electronics suitable for functional operation and which are illustrated as being strapped together for ease of assembly with front plate 12, are mechanically attached to and supported by the front plate 12. Each of the panels 28, 30, 40, 42 may include various operational features that either display or indicate information, like displays, gauges, and indicators, and that regulate operation of a component, such as controls like switches, dials, knobs, and buttons.

The front plate 12 closes out the center stack 10 and is secured to the back plate 16 with conventional fasteners. Integrally molded with the front plate 12 are posts 45 that project from the hidden inner surface 11 of the front plate 12 opposite to visible outer surface 14 and provide a structure 47 capable of being coupled with these fasteners. Other integrally-molded fastening structures 47 provided on the hidden surface 11 of front plate 12 may be used, along with integrally-molded fastening structures 49, such as clip towers, on the back plate 16, to mount the center stack 10 to the instrument panel.

Each of the lateral wings 17, 19 includes one of a pair of openings 56, 58 that are coupled by ducting with the vehicle's HVAC system. These openings 56, 58 serve as vents that discharge air into the passenger cabin of the vehicle. Each of the openings 56, 58 is filled by an HVAC outlet 61, 63 with movable slats 60, 62, respectively, adjustable in orientation for directing discharged air. Additional panels 64, 66 bearing controls are positioned in two additional openings 68, 70 that also flank the hidden outer surface 18 at a location spaced vertically from the corresponding one of openings 56, 58. These panels 64, 66 may be, for example, individualized HVAC controls for the driver and passenger of the motor vehicle.

The front plate 12 and back plate 16 of center stack 10 may be injection molded, which readily accommodates various features like undercuts, die locks, ribs, bosses, and attachment features in the construction. Injection molding processes also permit the introduction of inserts, such as an in-mold appliqué to provide a visible decorative finish on the front plate 12 or a bezel to define an opening in the back plate 16, into the mold before molding. Front plate 12 and back plate 16 may be formed from a relatively rigid thermoplastic, such as a polycarbonate/acrylonitrile-butadiene-styrene (PC/ABS) blend that may be either neat or filled.

A Class A surface finish is applied to portions of the back plate 16 before assembly with the front plate 12. Specifically, the visible outer surface 15, 21 of each of the wings 17, 19 may be painted or an appliqué may be strategically inserted into the mold before the injection molding process forming back plate 16 so that the injected molten thermoplastic overmolds the appliqué. Similarly, a Class A surface finish is applied to the visible outer surface 14 of the front plate 12. These surface finishes on visible surfaces 14, 15 and 21 are class A surface finishes. The surface finish on visible outer surface 14 will typically differ or contrast from the surface finish on visible outer surfaces 15, 21, although the invention is not so limited. For example, the surface finish on visible outer surface 14 may be supplied by an appliqué while the surface finish on visible outer surfaces 15, 21 may be a coating of paint. The result is that the surface finishes on the visible outer surface 14 of the front plate 12 and the visible outer surfaces 15, 21 of the back plate 16 do not match.

As used herein, terms like "front", "rear", "inner" and "outer" are used to provide a convenient frame of reference. For example, outer surfaces are understood to be visible to an occupant of the vehicle's passenger cabin and inner surfaces are understood to be hidden from the view of the occupant. Alternative reference frames may be used to provide an equivalent description.

The assembled center stack 10 may be a separate substructure of an instrument panel assembly or may be integral with an instrument panel positioned inside the vehicle's passenger cabin. The instrument panel or panel assembly (not shown) is typically reinforced with metal brackets or cross-car beams.

The front plate 12 includes a laterally-spaced pair of side peripheral edges 72, 74 that connect a top edge 76 with a bottom edge 78. Defined at the interfaces between the side peripheral edges 72, 74 and the hidden outer surface 18 are slip planes that permit lateral adjustment of the front plate 12 as necessary to fit front plate 12 and back plate 16. As a result, the position of the front plate 12 can be varied laterally without degrading the appearance of the assembled center stack 10. The hidden outer surface 18 of the back plate 16 has a width measured between the juncture of hidden outer surface 18 with the wings 17, 19 that is greater than the width of the front plate 12 to permit the lateral adjustment. The perceived visual appearance of the vertical gaps between the side peripheral edges 72, 74 of front plate 12 and the wings 17, 19 does not change because of the presence of the slip planes.

Figure 3A:
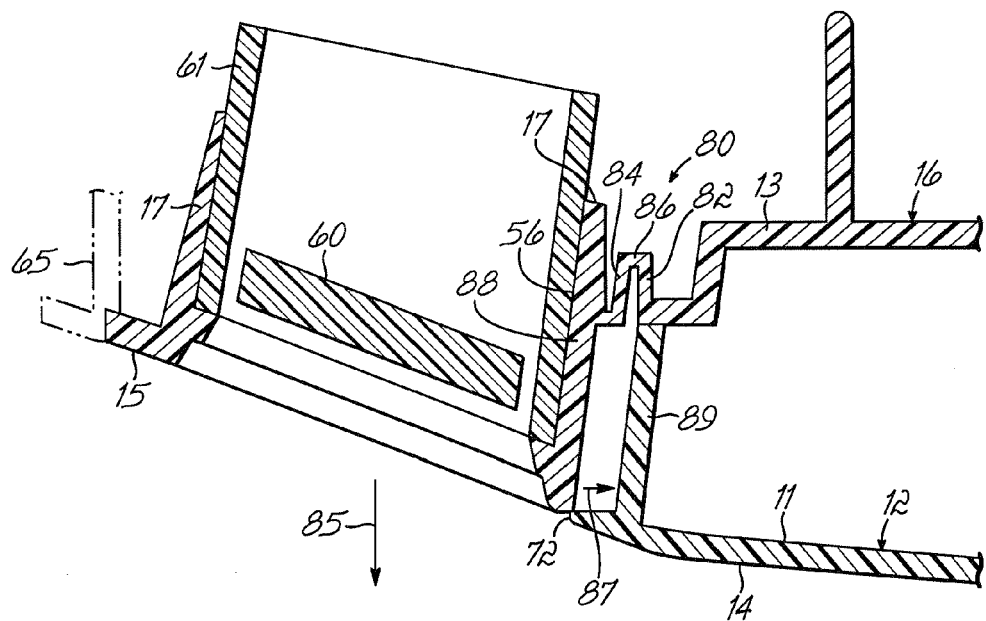
FIG. 3A is a cross-sectional view taken generally along line 3A-3A in FIG. 2.
Figure 3B:
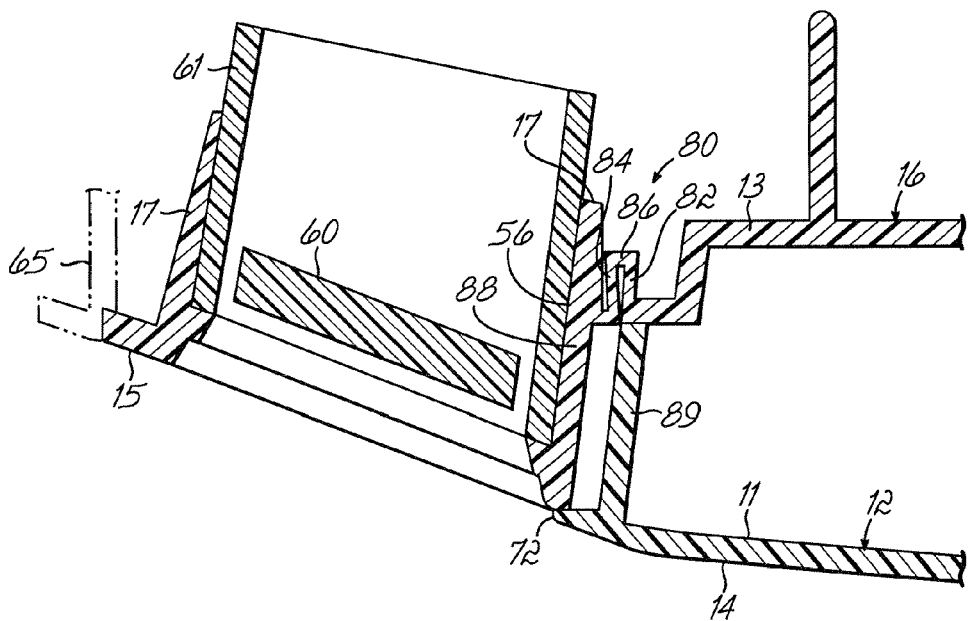
FIG. 3B is a cross-sectional view similar to FIG. 3A depicting the peripheral wings in a deflected condition.

With reference to FIGS. 3A and 3B, a flex joint 80 is defined in the material forming the back plate 16 at the junction between the central panel 13 and wing 17. A similar flex joint, although not shown, is defined in the material forming the back plate 16 at the junction between the central panel 13 and wing 19. The flex joint 80 permits the wing 17 to flex and move relative to the central panel 13, which permits a tight finish with the adjacent portion of the instrument panel 65, when the center stack 10 is installed in the vehicle, without damaging the material of the back plate 16 at a visible location.

Flex joint 80 extends vertically in the transition region between the central panel 13 and the wing 17. The flex joint 80 includes two legs or walls 82, 84 projecting away from a base wall 86. In the unbiased state shown in FIG. 3A, the walls 82, 84 diverge from base wall 86 so that a V-shaped gap or recess is defined between the walls 82, 84, 86 and a second V-shaped gap or recess is defined between wall 84 and an adjacent flange 88 of wing 17. The two V-shaped recesses open in opposite directions and neither is visible in the assembled center stack 10. A flange 89 extends from the hidden surface 11 of front plate 12 to contact the back plate 16 and thereby space the face and back plates 12, 16.

When the center stack 10 is installed, a force is applied to the wing 17, as diagrammatically indicated by single-headed arrow 85, that causes the wing 17 to rotate along flex joint 80 relative to the stationary and rigid central panel 13. The rotation causes flange 88 to move closer to flange 89 of the front plate 12, as indicated by single-headed arrow 87. The rotation of wing 17 is accommodated by the flex joint 80, as wall 84 moves toward wall 82 so as to close or collapse the intervening V-shaped recess and the flange 88 moves toward wall 84 to close or collapse the other V-shaped recess. The side peripheral edge 72 of the front plate 12 is stationary relative to the moving flange 88. While experiencing a typical amount of flexure, the visible outer surface 14 of the front plate 12 near the side peripheral edge 72 overlaps with the visible outer surface 15 on flange 88. As a result, there is no visible gap between the peripheral edge 72 of front plate 12 and back plate 16 when a typical amount of flexure is experienced by wing 17 relative to central panel 13.

If the wings 17, 19 projected laterally from the front plate 12 instead of the back plate 16, the Class A surface finish applied to the visible outer surfaces 14, 15, 21 could be degraded by flexing during installation of the center stack 10. Therefore, mounting the wings 17, 19 to the back plate 16 in accordance with the present invention is advantageous in this regard. If the back plate 16 is painted to provide the Class A surface finish on the visible outer surfaces 15, 21, any overspray on the hidden outer surface 18 of center panel 13 is hidden by the front plate 12 in the assembly so that masking is not required during the painting operation. The center panel 10 may be fabricated by injection molding the front plate 12 in a first injection molding tool and injection molding the back plate 16 in a second injection molding tool. The wings 17, 19 are formed in the injection molding process forming the back plate 16, so that a separate injection molding process and tool is not required.

Figure 4:
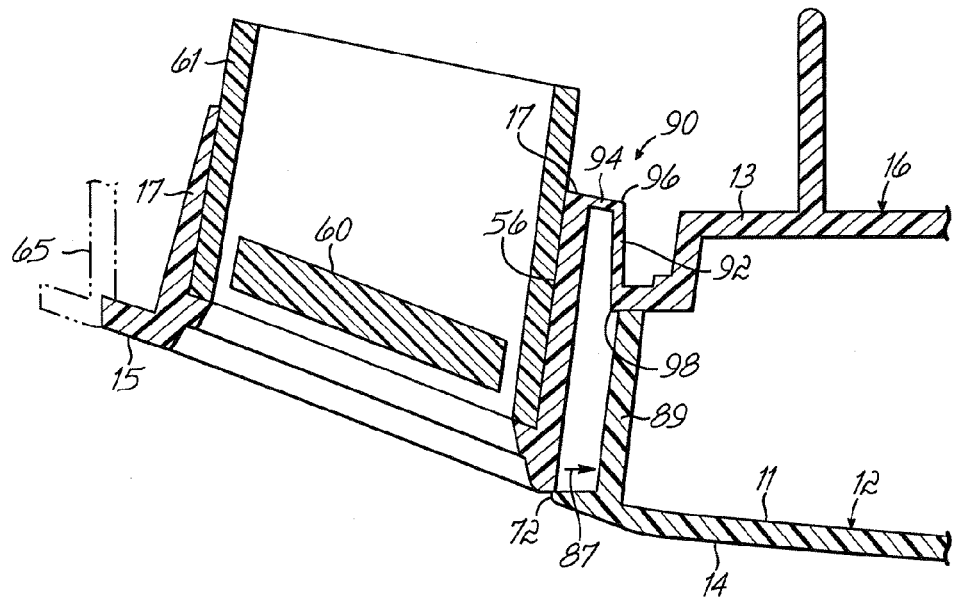
FIGS. 4 and 5 are cross-sectional views similar to FIG. 3A in accordance with alternative embodiments of the present invention.

With reference to FIG. 4 in which like reference numerals refer to like features in FIG. 3A and in accordance with an alternative embodiment of the invention, a vertically-extending flex joint 90 couples the central panel 13 and the wing 17 to define the transition region. Flex joint 90 includes two legs 92, 94 that connect flange 88 with the central panel 13. The legs 92, 94 join at a corner 96 and leg 92 joins the central panel 13 along a corner 98. An outwardly directed force applied to wing 17 causes flange 88 to move toward flange 89 as in direction 87. The movement is accommodated by movement of the legs 92, 94 along corners 96, 98.

Figure 5:
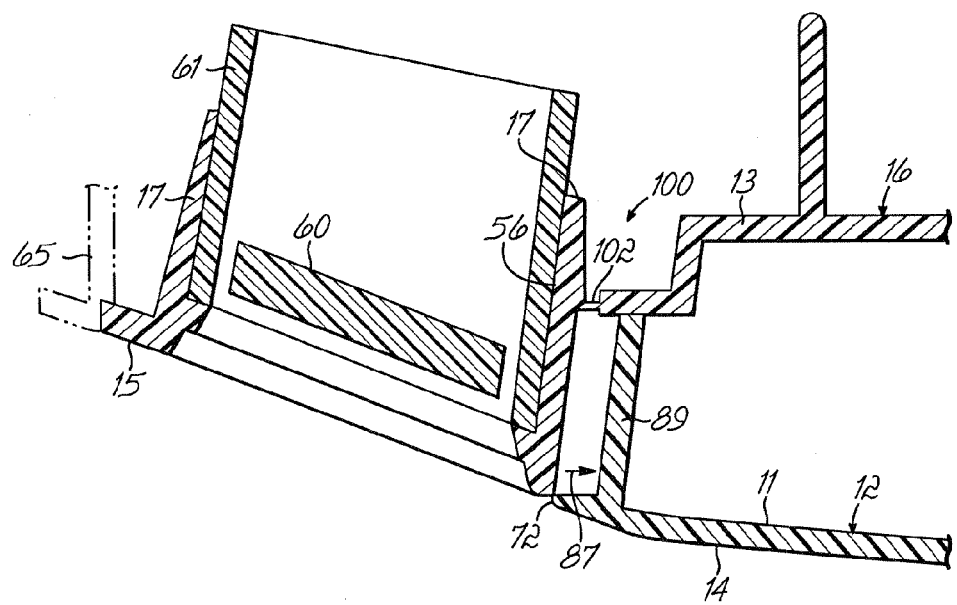

With reference to FIG. 5 in which like reference numerals refer to like features in FIGS. 3A and 4 and in accordance with an alternative embodiment of the invention, a vertically-extending flex joint 100 couples the central panel 13 and the wing 17 to define the transition region. Flex joint 100 includes a thinned wall or region 102 that joins the central panel 13 with the flange 88 of wing 17. The thinned region 102 is thinned relative to the full thickness of the central panel 13. An outwardly directed force applied to wing 17 causes flange 88 to move toward flange 89 as in direction 87. The movement is accommodated by movement of flexing of the thinned region 102 as the thinned region 102 yields more easily than the adjacent portions of central panel 13 and flange 88. The front plate 12 completely covers the flex joint 100 so that it is not visible to an individual inside the passenger cabin of the motor vehicle.

Flex joints 80, 90, 100 may be used at other locations and for other purposes in the construction of interior components for a motor vehicle in which one portion of a component must flex relative to another portion of the component.

While the invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. A center stack for an instrument panel of a motor vehicle having an operational feature and an HVAC system, said center stack comprising:
   a front plate having an exposed surface with a first surface finish, said front plate including at least one opening extending through said exposed surface for accessing the operational feature; and
   a back plate having a visible portion uncovered by said front plate and a central panel covered by said front plate, said visible portion having a second surface finish, and said visible portion including a first opening configured to be coupled with the HVAC system of the motor vehicle,
   wherein said first and second surface finishes are Class A surface finishes, and said front plate includes a flange arranged to partially overlap said visible portion of said back plate at a boundary between said visible portion of said back plate and said exposed surface of said front plate.

2. The center stack of claim 1 wherein said visible portion extends laterally relative to said central panel.

3. The center stack of claim 2 wherein said back plate further includes a flex joint joining said visible portion with said central panel, said flex joint permitting said visible portion to move relative to said central panel.

4. The center stack of claim 3 wherein said flex joint further includes a pair of converging walls separated by a gap, said gap capable of narrowing when a force is applied to move said visible portion relative to said central panel.

5. The center stack of claim 3 wherein said flex joint further includes a thinned wall capable of flexing when a force is applied to move said visible portion relative to said central panel.

6. The center stack of claim 1 wherein said visible portion includes first and second visible regions that flank said central panel on opposite lateral sides.

7. The center stack of claim 6 wherein said first visible region includes said first opening, and said second visible region includes a second opening configured to be coupled with the HVAC system of the motor vehicle.

8. The center stack of claim 6 wherein said back plate further includes a first flex joint joining said first visible region with said central panel and a second flex joint joining said second visible region with said central panel, said first and second flex joints permitting a conesponding one of said first and second visible regions to move relative to said central panel.

9. The center stack of claim 8 wherein each of said first and second flex joints further includes a pair of converging walls separated by a gap, said gap capable of narrowing when a force is applied to move a corresponding one of said visible regions relative to said central panel.

10. The center stack of claim 8 wherein each of said first and second flex joints further includes a thinned wall capable of flexing when a force is applied to move a conesponding one of said visible regions relative to said central panel.

11. The center stack of claim 1 wherein said first and second surface finishes differ.

12. A center stack for an instrument panel of a motor vehicle having an operational feature, said center stack comprising:
 a front plate having an exposed surface and at least one opening extending through said exposed surface for accessing the operational feature; and
 a back plate having a central panel covered by said front plate, a visible portion uncovered by said front plate, and a flex joint joining said visible portion with said central panel, said flex joint permitting said visible portion to move relative to said central panel.

13. The center stack of claim 12 wherein said back plate further includes a central panel covered by said front plate, and said visible portion extends laterally relative to said central panel.

14. The center stack of claim 13 wherein said visible portion includes an opening configured to be coupled with an HVAC system of the motor vehicle.

15. The center stack of claim 12 wherein said flex joint further includes a pair of converging walls separated by a gap, said gap capable of narrowing when a force is applied to move said visible portion relative to said central panel.

16. The center stack of claim 12 wherein said flex joint further includes a thinned wall capable of flexing when a force is applied to move said visible portion relative to said central panel.

17. The center stack of claim 12 wherein said back plate further includes a central panel covered by said front plate, and said visible portion includes first and second visible regions that flank said central panel on opposite lateral sides.

18. The center stack of claim 17 wherein each of said visible regions includes an opening configured to be coupled with an HVAC system of the motor vehicle.

19. The center stack of claim 12 wherein said exposed surface of said front plate has a first Class A surface finish, and said visible portion of said back plate has a second Class A surface finish that differs from the first class A surface finish.

* * * * *

UNITED STATES PATENT AND TRADEMARK OFFICE
CERTIFICATE OF CORRECTION

PATENT NO. : 7,264,294 B2
APPLICATION NO. : 10/906550
DATED : September 4, 2007
INVENTOR(S) : Gresham et al.

Page 1 of 1

It is certified that error appears in the above-identified patent and that said Letters Patent is hereby corrected as shown below:

Column 6:
Claim 4, line 45, change "naffowing" to --narrowing--.
Claim 8, line 62, change "conesponding" to --corresponding--.

Claim 10, column 7, line 6, change "conesponding" to --corresponding--.

Signed and Sealed this

Twenty-seventh Day of November, 2007

JON W. DUDAS
*Director of the United States Patent and Trademark Office*